United States Patent [19]

Stenzel

[11] 4,376,741

[45] Mar. 15, 1983

[54] METHOD AND APPARATUS FOR CONTINUOUSLY EXTRUDING AN EXPANDABLE THERMOPLASTIC RESIN COMPOSITION ONTO AN ELONGATED PREFORM

[75] Inventor: Hans-Dieter Stenzel, Hanover, Fed. Rep. of Germany

[73] Assignee: Kabel-und Metallwerke Gutehoffnungshuette AG, Hanover, Fed. Rep. of Germany

[21] Appl. No.: 127,538

[22] Filed: Mar. 6, 1980

[30] Foreign Application Priority Data

Mar. 21, 1979 [DE] Fed. Rep. of Germany ....... 2910965

[51] Int. Cl.³ .............................................. B29D 27/00
[52] U.S. Cl. ..................................... 264/45.9; 264/50; 264/174; 264/DIG. 18; 425/4 C; 425/113; 425/208
[58] Field of Search ........ 264/45.9, 50, 174, DIG. 18; 425/817 C, 4 C, 133.1, 208, 113

[56] References Cited

U.S. PATENT DOCUMENTS

| | | | |
|---|---|---|---|
| 3,287,477 | 11/1966 | Vesilind | 264/53 |
| 3,787,542 | 1/1974 | Gallagher et al. | 425/817 C X |
| 3,814,779 | 6/1974 | Wiley | 264/53 |
| 3,968,463 | 7/1976 | Boysen | 264/45.9 X |
| 4,181,647 | 1/1980 | Beach | 264/50 X |

OTHER PUBLICATIONS

Bernhardt, Ernest C., Edt., "Processing of Thermoplastic Materials", New York, Reinhold, ©1959, pp. 154–164.

Schenkel, Gerhard, "Plastics Extrusion Technology and Theory", New York, American Elsevier, ©1966, pp. 202–205.

"Whittington's Dictionary of Plastics", by Lloyd R. Whittington, Stamford, Conn., Technomic, ©1968, pp. 98–101.

Primary Examiner—Philip E. Anderson
Attorney, Agent, or Firm—Martin A. Farber

[57] ABSTRACT

An improved apparatus for extruding an expandable thermoplastic composition onto an elongated article is disclosed comprising an extruder housing; a cylindrical extruder screw axially positioned within an extruder barrel within the housing; a device for heating the expandable thermoplastic composition passing through the hollow chamber; a gas input for supplying an inert gas into the extruder barrel; and a die head attached to the output end of the extruder housing through which an elongated article is passed for the extrusion thereon of the expandable thermoplastic composition. The cylindrical extruder screw which is of a conventional length, comprises a shaft portion from whose circumference extend in addition to the usual helically wound conveyor members, at least two shearing members whose surface configurations with respect to the surface of the hollow chamber in the housing, and longitudinal positions with respect to the gas input, provides a pressure retention chamber into which the inert gas is fed to elevate the pressure applied to the expandable thermoplastic composition for increasing the quantity of inert gas dissolved therein.

8 Claims, 3 Drawing Figures

METHOD AND APPARATUS FOR CONTINUOUSLY EXTRUDING AN EXPANDABLE THERMOPLASTIC RESIN COMPOSITION ONTO AN ELONGATED PREFORM

The invention is directed to an improved apparatus and method for extruding an expandable thermoplastic composition onto an elongated article. More particularly, the instant apparatus utilizes the injection of inert gas to elevate the pressure conditions within the extruding apparatus to achieve an increase in the amount of inert gas dissolved in the expandable composition as it is being extruded through the apparatus, resulting upon its exit from the die head in a layer of foamed thermoplastic composition on the elongated article of improved density and associated mechanical and electrical characteristics.

As the term is utilized in the specification, "elongated articles" may include electrical wires, cables, metallic pipes, etc. For example, a foamed jacket may be advantageously extruded upon metallic pipes if they are to be employed for transmitting heated gaseous or liquid media. In the case of electrical wires or cables, the elongated article may be of a conductive core of a communications cable or general purpose electrical cables.

The apparatus of the instant invention is appropriate for the manufacture of high frequency cables wherein the inner conductor is to be coated with a dielectric material of for example, foamed polyethylene. Although the invention hereafter described is delineated in the context of coaxial high frequency cables, the principles of the instant invention apply to the other stated uses hereinabove noted. In the case of high frequency cables a desirable characteristic is that the dielectric layer be of an electrical quality to present minimum power loss. To minimize power loss, the expandable thermoplastic composition to be used must be of a maximum purity and the resulting foamed or expanded state of the dielectric must be uniform and extensive. Injecting inert gas into an extruder, for example, as described in U.S. Pat. No. 3,968,463, for direct dispersion of the inert gas into the thermoplastic composition is a means for achieving improved dielectric purity.

It is an object of the present invention to provide an apparatus and method that enables the formation of a foamed thermoplastic composition layer on an elongated article which has an improved density of less than 0.3 grams per ccm.

The object of the invention is obtained by providing an extruder apparatus having a conventional length extruder screw so configured that upon rotation of the extruder screw, there is continuously provided (i) a flow path for the expandable composition from the input end to the output end of the extruder housing, and (ii) a pressure retention chamber in the portion of the extruder barrel of the extruder delineated by a first and second shearing member longitudinally positioned along the length of the extruder screw. An inert gas is injected through an orifice of the extruder housing into the pressure retention chamber for increasing the pressure applied to the expandable composition passing through the extruder housing, for increasing the quantity of the inert gas dissolved in the unexpanded thermoplastic composition which results in improved density characteristics of the expanded composition as it is formed as a layer upon the elongated article.

The invention will be further described with respect to the accompanying drawings, wherein.

Figure 1:
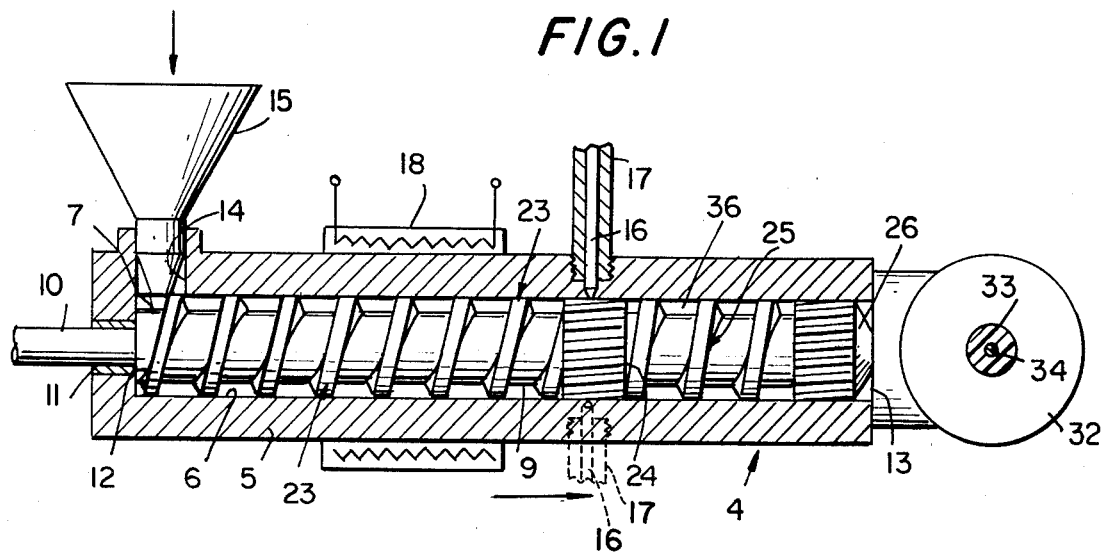
FIG. 1 is a side sectional view of an embodiment of an extrusion apparatus of the present invention.

The extrusion apparatus shown in FIG. 1 comprises an extrusion device 4 comprising a housing 5 having a cylindrical extruder barrel 6 extending through most of its length. Mounted within the extruder barrel 6 for rotational movement about its longitudinal axis is a cylindrical extruder screw 7. Located at one end of the extruder screw 7 is a power shaft extension 10, that extends through an aperture 11 located in the input end 12 of the housing 5. The power shaft extension 10 is coupled to a rotational drive mechanism of conventional design (not shown) for controlled rotational motion of the cylindrical extruder screw 7 about its longitudinal axis. The major length of the extruder screw 7 extends longitudinally within the extruder barrel 6 from the input end 12 to an opposite output end 13 of the housing 5. Located in the housing 5 in the vicinity of the input end 12 is a feed aperture 14 that communicates at its lower end with the extruder barrel 6 and expands at its upper extremity to communicate with a feed funnel 15. Further, the housing 5 includes at least one gas input orifice 16 that communicates with the hollow chamber 6. (Although FIG. 1 illustrates only one gas input orifice 16, it is recognized that a plurality of such orifices as indicated by dashed lines entering the extruder barrel 6 from different radial positions may be provided at such downstream position). Coupled to the orifice 16 is an inlet pipe 17 which communicates with a controllable source of inert gas (not shown). Positioned about the housing 5, between the feed aperture 14 and the gas input orifice 16 is at least one heating device 18 adapted to heat the encompassed walls of the housing 5, and consequently to heat the adjacent interior volume of the extruder barrel 6, for assuring that an expandable composition passing through the extruder barrel 6 is substantially melted prior to its reaching the downstream position of the gas input orifice 16.

The portion of the cylindrical extruder screw 7 extending longitudinally within the extruder barrel 6 comprises a cylindrical shaft portion 9 from which circumference extend: a helically wound conveyor part 23; a radially extending, first shearing member 24; a helically wound conveyor part 25; and a radially extending, second shearing member 26. The first shearing member 24 is longitudinally positioned ½ to ⅔ the length of the shaft portion 9 from the input end 12 of the housing 5, but no further distant from the input end 12 than the gas input orifice 16; while the second shearing member 26 is longitudinally positioned at least 4/5 the length of the shaft portion 9 from the input end 12 of the housing 5. The helically wound conveyor part 23 extends longitudinally from the input end 12 to the first shearing member 24; while the helically wound conveyor part 25 extends longitudinally from the first shearing member 24 to the second shearing member 26. Except for the interposed shearing members 24 and 26, the cylindrical extruder screw 7 is a commercially available type, short length extruder screw having a ratio of length to diameter between 16:1 and 28:1 (preferably 25:1).

Figure 2:
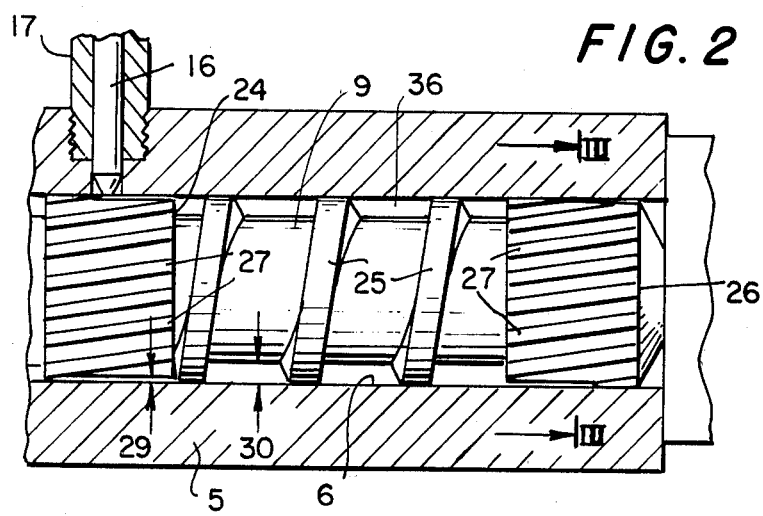
FIG. 2 is an enlarged sectional view of a portion of the extrusion apparatus illustrated in FIG. 1.
Figure 3:
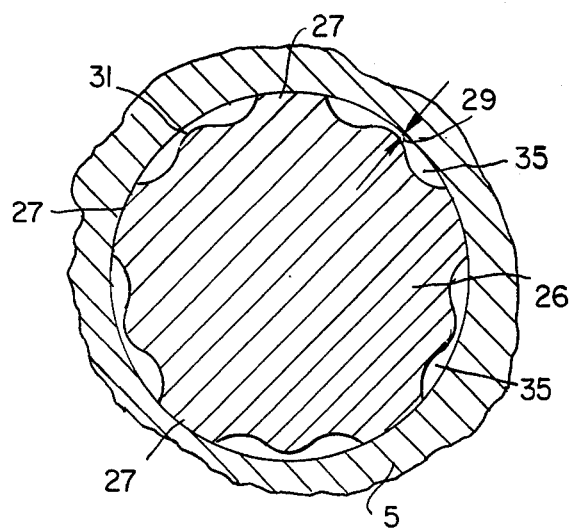
FIG. 3 is an enlarged cross-sectional view along the line III—III of FIG. 2.

Each of the shearing members 24 and 26 includes a plurality of obliquely extending ribs 27 which are evenly disposed about the circumference of the shearing member 24 or 26. As more particularly illustrated in FIGS. 2 and 3, each of the shearing members 24 and 26 has a minor distance 29 between the extending protrusions 31 of the member 24 or 26, between adjacent obliquely extending ribs 27 and immediately opposite surfaces of the cylindrical extruder barrel 6, as contrasted to larger distance 30 between the outer surface of the shaft portion 9 and the opposite surface of the extruder barrel 6. Each of the ribs 27 engages the adjacent surface of the extruder barrel 6 in a tight slidable fit, in a manner similar to the tight slidable fit between each of the conveyor parts 23 and 25 and the immediately adjacent surfaces of the extruder barrel 6.

The extrusion device 4 further comprises a die head 32 that incorporates a longitudinally extending aperture 33, through which a wire 34 to be coated with an expandable composition may be axially passed, and which communicates with the output end 13 of the housing 5 for receiving the expandable composition.

The operational method associated with the extrusion device 4 of FIG. 1 may be summarized as follows:

An expandable thermoplastic composition, usually in pellet form and having nucleating and cross-linking agents added thereto, is fed into the feed funnel 15, through the feed aperture 14, into the cylindrical extruder barrel 6, at the input end 12 of the housing 5. With the cylindrical extruder screw 7 being continuously rotated by the exterior rotational drive mechanism (not shown), the resulting rotating helically wound, conveyor part 23 transversely moves the expandable composition from the input end 12 toward the radially extending shearing member 24. During such transverse movement the pellets are compacted to exhaust the entrained air out the feed aperture 14, and the expandable composition assumes a substantially melted condition as a result of the heat provided by the heating device 18 to the interior volume of the extruder barrel 6. Further, the tight, slidable fit between the rotating helically wound conveyor part 23 and the immediately adjacent surface of the extruder barrel 6, and the compressive action of the conveyor part 23 against the melted expandable composition, provides a high pressure condition at the upstream side of the first shearing member 24. The restricted character of the volumes 35 for transverse passage of the melted expandable composition between the first shearing member 24 and the opposite adjacent surfaces of the cylindrical extruder barrel 6, provides with the expandable composition fed thereinto, a mechanism for maintaining a high pressure condition on the downstream side of the first shearing member 24. Similarly, the restricted character of the volumes 35 for the transverse passage of the melted expandable composition between the second shearing member 26 and the opposite adjacent surfaces of the cylindrical extruder barrel 6, provides with the expandable composition fed thereinto by the rotating helically wound conveyor part 25, a mechanism for maintaining a high pressure condition in the extruder barrel 6 between the shearing members 24 and 26.

Although the extrusion device 4 provides a dynamic continuous path for the passage of the expandable composition from the input end 12 to the output end 13 of the housing 5, i.e., the varying spaces between the rotating cylindrical extruder screw 7 and the fixed surface of the extruder barrel 6, there is provided a pressure retention chamber 36 in that portion of extruder barrel 6 delineated by shearing members 24 and 26.

Inert foaming gas is injected into the extruder barrel 6, more particularly, into the pressure retention chamber 36, by the passage of such gas from the source of inert gas (not shown), through the inlet pipe 17 and gas input orifice 16, into the melted expandable composition that has already entered the pressure retention chamber 36. The gas input orifice is positioned opposite to a longitudinal central portion of the first shearing member 24. Since pressure or gas leaks from the pressure retention chamber 36 are minimal both in the direction of the input end 12 of the housing 5, and the direction of the output end 13, the pressure within the pressure retention chamber 36 is increased by injecting, at elevated pressures, quantities of the inert gas into the pressure retention chamber 36. This novel employment of a pressure retention chamber avoids the necessity for special, long length extruders for obtaining a longer dwell time of the expandable composition within the extruder, and a build up of pressure as the result of the rotation of the helically wound conveyor parts, as the inert gas itself provides the desired elevated compressive pressures in the chamber 36, that result in increased amounts of the inert gas being dissolved in the expandable composition during this extrusion process.

The expandable composition with the inert gas dissolved therein is extruded from extruder barrel 6 into the die head 32. Simultaneously, the electrical wire 34 which is to be coated with the extruded composition, is passed through the longitudinally extending aperture 33. As the wire 34 passes through die head 32 a uniform coating of the extrudate is circumferentially applied to the wire 34. The initial thickness of the extruded coating is determined by the aperture 33. As the thus coated wire 34 travels out and away from die head 32, the coating thereon, which may contain a nucleating agent and the pressurized inert gas, expands because the coated wire is no longer in a pressurized environment.

Numerous modifications and variations of the present invention are possible in light of the above teachings and therefore, within the scope of the appended claims the invention may be practiced otherwise than as particularly described.

I claim:

1. Method for extruding a thermoplastic composition onto an elongated article to provide a layer of foamed thermoplastic composition thereon, comprising the steps of feeding the composition into an input end of an extruder housing containing a conveyor screw, adding nucleating agents to the thermoplastic composition before such composition is fed into said input end of said extruder housing, conveying said composition along a conveyor screw and simultaneously compressing and heating said composition, providing while not compressing the composition a pressure retention chamber along a portion of the conveyor screw having a higher pressure than at other portions along the screw and maintaining the higher pressure substantially without pressure drop in said pressure retention chamber, injecting an inert gas at the higher pressure into said pressure retention chamber, extruding the resultant mixture about the elongated article.

2. Method for extruding a thermoplastic composition onto an elongated article to provide a layer of foamed thermoplastic composition thereon, comprising the steps of feeding the composition into an input end of an extruder housing containing a conveyor screw, adding cross-linking agents to the thermoplastic composition before such composition is fed into said input end of said extruder housing, conveying said composition along a conveyor screw and simultaneously compressing and heating said composition, providing while not compressing the composition a pressure retention chamber along a portion of the conveyor screw having a higher pressure than at other portions along the screw and maintaining the higher pressure substantially without pressure drop in said pressure retention chamber, injecting an inert gas at the higher pressure into said pressure retention chamber, extruding the resultant mixture about the elongated article.

3. An improved apparatus for extruding an expandable thermoplastic composition onto an elongated article to provide a layer of foamed thermoplastic composition thereon, comprising: an extruder housing having an inner surface defining an extruder barrel, an input end at which a composition is fed, an output end at which the composition is extruded, and means comprising a feed opening located in a vicinity of said input end and communicating with said extruder barrel for feeding of the composition therein; a rotatable extruder screw axially positioned within said extruder barrel having a ratio of length to diameter of at least 16:1; means for heating at least a portion of said extruder barrel and thereby the composition within said extruder barrel; gas input means extending into a portion of said extruder barrel; and a die head means attached to the output end of said extruder housing having a longitudinally extending aperture communicating with said extruder barrel and through which the elongated article may be passed for extrusion thereon of the composition; the improvement comprising:

said extruder screw having a compression zone and ratio of length to diameter of at most 28:1 and comprising, within said extruder barrel, a shaft portion from whose circumference extend only a first helical conveyor part;

means for providing and substantially maintaining a constant high pressure relative to that in other portions of the extruder barrel in a pressure retention chamber comprising only two axially spaced apart shearing members constituting a first shearing member having an outer diameter at portions substantially equal to a corresponding diameter of said inner surface of said extruder barrel positioned from said input end of said housing a distance of ½ to ⅔ the length of said extruder screw, but no further distant from said input end than said gas input means and a second shearing member having an outer diameter at portions substantially equal to the corresponding diameter of said inner surface of said extruder barrel positioned from said input end of said housing a distance of at least 4/5 the length of said cylindrical extruder screw;

said shearing members each includes a plurality of obliquely extending ribs evenly disposed about the periphery thereof and said oblique ribs having an outermost surface, said outermost surface constituting said portions, said portions having a diameter substantially equal to a corresponding diameter of said inner surface of said extruder barrel and rotatably tightly slidably engaging said inner surface of said extruder housing and a protrusion between adjacent said ribs, said protrusions defining a minor distance spaced from said inner surface and said periphery of said shearing members undulating between said adjacent ribs defining a larger distance spaced from said inner surface than said minor distance and defining restricted volumes for transverse passage of the composition; and a second helical conveyor part disposed between said first and second shearing members, said shearing members each have an axial length several times greater than the axial thickness of said helical conveyor parts; and said compression zone being in said extruder barrel between said input end and said first shearing member, said gas input means positioned opposite to a longitudinal central portion of said first shearing member for injecting an inert gas at elevated pressure into said extruder barrel between said two shearing members, whereby, as said extruder screw is rotated, there is continuously provided (i) a flow path for the composition from said input end to said outlet end of said extruder housing and (ii) said pressure retention chamber defined by said first and second shearing members having therein said high pressure relative to the other portions of said extruder barrel with said high pressure being maintained substantially without change throughout said pressure retention chamber and defined in said extruder barrel delineated by said first and second shearing members, the inert gas being injected into said pressure retention chamber to increase the pressure applied to the composition passing through said pressure retention chamber to obtain an increased quantity of the inert gas dissolved in the composition.

4. Apparatus in accordance with claim 1, wherein said cylindrical extruder screw has a ratio of length to diameter of approximately 25:1.

5. Apparatus in accordance with claim 1, wherein said gas input means comprises a plurality of gas input orifices entering said hollow chamber from different radial positions about the circumference of said hollow chamber.

6. The apparatus in accordance with claim 1, wherein said first and second helical conveyor parts rotatably tightly slidably engage said inner surface of said extruder housing.

7. The apparatus as set forth in claim 6, wherein said outermost surface of said oblique ribs includes an oblique cylindrical segment.

8. The apparatus as set forth in claim 7, wherein the axial length of said shearing members is substantially equal to the radii thereof.

* * * * *